United States Patent
Byers et al.

[19]

[11] Patent Number: 5,887,885
[45] Date of Patent: Mar. 30, 1999

[54] SELF-LOCKING TRAILER HITCH ASSEMBLY

[76] Inventors: Dwight R. Byers, 5149 McCandless Rd., Butler, Pa. 16001; Hugh M. Trautmann, 172 Reibold Rd., Renfrew, Pa. 16053

[21] Appl. No.: 794,850

[22] Filed: Feb. 6, 1997

[51] Int. Cl.$^6$ ............................................ B60D 1/06
[52] U.S. Cl. ............................................ 280/512; 280/511
[58] Field of Search .................................. 280/511, 512, 280/513, 508, 509

[56] References Cited

U.S. PATENT DOCUMENTS

| | | | |
|---|---|---|---|
| 2,459,448 | 1/1949 | Murray | 280/512 |
| 2,726,099 | 12/1955 | Nunn, Jr. . | |
| 2,855,222 | 10/1958 | Bolmes et al. . | |
| 2,971,777 | 2/1961 | Weber et al. . | |
| 4,133,553 | 1/1979 | Pierce . | |
| 4,209,184 | 6/1980 | Byers . | |
| 4,416,467 | 11/1983 | Bradley | 280/512 |
| 4,444,410 | 4/1984 | Martin . | |
| 5,573,263 | 11/1996 | Denny et al. | 280/512 |
| 5,632,501 | 5/1997 | Jackson et al. | 280/511 |

FOREIGN PATENT DOCUMENTS

| | | | |
|---|---|---|---|
| 2087817 | 6/1982 | United Kingdom | 280/512 |

*Primary Examiner*—Daniel G. DePumpo
*Attorney, Agent, or Firm*—George C. Atwell

[57] ABSTRACT

A self-locking trailer hitch assembly includes an elongated housing attachable to the draw bar of a towed vehicle, and the housing includes an attachment end and an opposite socket which is shaped to receive a vertically-projecting ball member. The ball member is mounted to the draw bar at the rear of the towing vehicle. Disposed within the housing adjacent the socket is a jaw pivotable on a horizontal axis so that the jaw can be pivoted to a ball locking position for holding and retaining the ball member within the socket and also pivotable to a ball releasing position for unlocking and releasing the ball member from the socket so that the towed vehicle can be uncoupled from the towing vehicle. A unique releasing function is provided by a manually-operable latch which disengages the jaw from the ball locking position in order to facilitate removal of the ball member from the socket, but manual operation of the latch is not required to seat and positively lock the ball member within the socket.

15 Claims, 7 Drawing Sheets

FIG. 12

SELF-LOCKING TRAILER HITCH ASSEMBLY

BACKGROUND OF THE INVENTION

This invention relates generally to trailer hitch couplings and assemblies of the ball and socket type and, more particularly, to an improved trailer hitch assembly that has an automatic and positively locking function which obviates the need for manipulation of a latch or lever by the user to lock the assembly onto a vertically-projecting ball at the rear of a towing vehicle.

A self-locking trailer hitch assembly is disclosed in U.S. Pat. No. 4,209,184 issued Jun. 24, 1980. That assembly disclosed structure for achieving an automatic locking function as an incident of placing the coupler on the ball member. However, the design has proven to be both structurally and aesthetically unacceptable because a feature of that structure is its susceptibility to being induced to lock without the ball member being properly contained within the socket if the assembly is inadvertently positioned too far forward over the ball by the user when bringing the assembly into a hitching position. This occurs when the assembly is positioned above the upwardly-projecting ball member, but with the socket forward of the ball member; as the assembly is lowered onto the ball member, a jaw retainer component is forced into a locking disposition by the forcible contact of the ball member thereagainst as the user unsuccessfully attempts to hitch the assembly to the ball member.

Therefore, there is a need for a self-locking trailer hitch assembly which avoids inadvertent coupling action and also locks onto the ball member without requiring user manipulation of latches or levers to actuate the locking and coupling action of the assembly.

SUMMARY OF THE INVENTION

The present invention comprehends a self-locking trailer hitch assembly which automatically locks onto the trailer ball member at the rear of a towing vehicle without manipulation of the assembly by the user to initiate and complete the locking action of the assembly onto the ball member.

The trailer hitch assembly includes an elongated housing forming an inverted socket which is U-shaped in cross section. The housing has an attachment end for securement to the draw bar of the towed vehicle and an opposite rounded socket for receiving and retaining therein the ball member. Pivotably mounted on a horizontal axis within the housing adjacent the socket is a jaw which selectively pivots from a ball releasing position to a ball locking position and back to a ball releasing position. Secured to and projecting below the housing is a ramp which serves to guide the socket to the ball member on those instances when the housing is positioned too far forward of the ball member. In addition, the ramp provides an abutment surface for a biasing means which is secured to the same horizontal axis as the jaw. The biasing means exerts an upward force on the jaw, thus normally biasing the jaw to the ball releasing position.

Mounted on the upper flat surface of the housing is a shroud or cover, and disposed partially within the shroud is a slidable, linearly-reciprocable latch. The latch includes a manually-operable actuating portion which protrudes outwardly from and slightly above the shroud. The latch automatically slides toward the socket when the jaw has been pivoted to the ball locking position for retaining the ball member within the socket and the latch can be manually slid toward the attachment end in order to permit the jaw to pivot to the ball releasing position for allowing removal of the socket from the ball member.

Enclosed within the shroud is a latch portion which projects upwardly through a longitudinal housing slot on the upper surface of the housing. The latch portion is shaped to facilitate the slidable movement of the latch and cooperates with the jaw during the pivotable movement of the jaw from the ball releasing position to the ball locking position and back to the ball releasing position. More specifically, rotatably mounted to the latch portion on a horizontal axis is a slide means which includes a pair of rollers journaled to a transverse pin which is secured to the base of the latch portion. As the socket is lowered upon the ball member, the ball member contacts and forces upward an inner projecting lip or ridge of the jaw, causing the jaw to pivot on its horizontal axis. Simultaneous with this movement, the rear edge of the jaw slides downwardly upon the rollers thereby allowing the ball member to enter and be completely received within the socket. The pivotable movement of the jaw stops when the inner lip of the jaw contacts the undersurface of the housing adjacent the socket. The jaw is now in the ball locking position and the ball member is fully retained within the socket. The jaw also includes a lower projecting lip or ridge, and as the ball member is seated within the socket, the lower lip engages the lower portion of the ball member and locks the ball member within the socket.

Projecting rearwardly of the latch is an integral finger which moves concomitant with the slidable movement of the latch. The rear of the shroud includes a slot through which the finger will project coincident with the movement of the latch. The finger includes a stem portion which is fully retained within the shroud, and riding on the stem is a compression spring. The spring cooperates with the pivotal movement of the jaw to lock the ball member within the socket. The spring is disposed in a relaxed state when the ball member is locked within the socket and the jaw is in the ball locking position. The spring is disposed to a compressed state for facilitating pivotable movement of the jaw to the ball releasing position so that the housing can be lifted off the ball member for unhitching the trailer or other type of towed vehicle from the towing vehicle.

It is an objective of the present invention to provide a self-locking trailer hitch assembly which automatically reacts to the reception of a ball member to positively lock the ball member without any initiation of the locking action by the user, and, further, is positive-locking when the coupling action occurs quickly or relatively slowly.

It is another objective of the present invention to provide a trailer hitch assembly that automatically adjusts to diametric variations in hitch balls intended to be utilized with the assembly.

It is a further objective of the present invention to provide an assembly which includes a fail-safe arrangement so that the coupling action of the assembly to the towing vehicle cannot occur unless the ball member is properly positioned within the socket of the assembly.

It is a still further objective of the present invention to provide an automatic self-locking trailer hitch assembly having secondary latching means capable of maintaining the assembly components in an unlocked disposition while the assembly is being unhitched from the ball member.

These and other objects, features, and characteristics of the present invention may be better understood from the following detailed description of the preferred embodiment when read in conjuction with the appended drawing figures.

DETAILED DESCRIPTION OF THE PREFERRED EMBODIMENT

Shown in FIGS. 1–12, is an improved self-locking trailer hitch assembly 10 for attaching a towing vehicle to a towed vehicle. The towing vehicle 11 can be a pick-up truck, Jeep, or automobile, and the towed vehicle can be a trailer supporting any type of outdoor boat, pleasure craft, motorbike, off road vehicle, or camper. Normally, the trailer or towed vehicle will have a projecting tongue (not shown) to which one end or part of a trailer hitch assembly is secured. The other end of the trailer hitch assembly is secured to a vertically-projecting ball member 12, such as the one shown in FIGS. 2–6, 11, and 12. The ball member 12 is attached to a screw-threaded mounting shank or stud 14 vertically extending through an aperture (not shown) in a horizontally-extending draw bar 16 constituting a hitch member 18. A nut 20 is used to further secure the stud 14 to the draw bar 16. The draw bar 16 is secured to the rear of the towing vehicle 11 and is centrally located adjacent the rear bumper 22.

Illustrated in FIGS. 1–12 is an elongated body member or housing 24 which may be a stamped metal component and is of an inverted U-shape in cross section. The housing 24 has a rear attachment end 26 and an opposite front end 28. The end 26 includes a plurality of apertures 30 which permit the removable securement of the assembly 10 to the draft tongue of a trailer. The housing 24 also includes a generally flat upper surface or roof 32 and opposed sidewalls 34. The apertures 30 are located in axial alignment on each sidewall 34 adjacent the end 26 so that fasteners can be inserted therethrough for attaching the assembly 10 to the draft tongue of the towed vehicle. The apertures 30 can also be located on the roof 32. Located at the end 28 is a rounded socket 36 which is shaped to fully receive and retain the ball member 12, and the socket 36 includes a downwardly-opening socket aperture 38 in which the ball member 12 is received and seated for attaching the assembly 10 to the vehicle 11. In addition, the housing 24 includes a longitudinal housing slot 40 that is formed in the roof 32 adjacent and slightly behind the socket 36.

As illustrated in FIGS. 2–8, 11, and 12, a significant major structural component of the assembly 10 is a selectively pivotable locking means disposed within the housing 24 adjacent the end 28. The pivotable locking means of the present invention includes a pivotable jaw 42 which pivots on a horizontal axis which extends transversely through the housing 24 from one sidewall 34 to the opposite sidewall 34 and is secured to each sidewall 34. The horizontal axis in the present invention is an elongated fixed stud or crosspin 44. The jaw 42 is disposed within the housing 24 immediately behind the aperture 38 and selectively pivots on the crosspin 44 between a ball locking position and a ball releasing position. These positions will be further described hereinafter as a function of the insertion of the ball member 12 within the socket 36 for locking the ball member 12 within the housing 24. The jaw 42 includes a generally flat upper surface or roof 46 which rests upon and also pivots upon the crosspin 44, a pair of opposed sidewalls 48 which extend parallel to but are spaced slightly inward from the opposed sidewalls 34, and a front or forwardly-facing concave-shaped wall 50 which contacts and abuts the ball member 12 during insertion and when the ball member 12 is fully inserted and seated within the aperture 38. The concave-shaped wall 50 further includes an inner-projecting ridge or lip 52 which is located at the point where the wall 50 meets and is integrally formed with the roof 46. Opposite the lip 52, and disposed at the lowest portion of the jaw 42, is a lower projecting ridge or lip 54.

It should be noted that the jaw 42 is an integral one-piece component, and may be manufactured as a stamped metal piece. The jaw 42 also includes a rear edge 56 integral with the roof 46 and which extends along the rearmost portion of the jaw 42. The lips 52 and 54 are forcibly contacted and engaged by the ball member 12 during insertion and seating of the ball member 12 within the aperture 38, and the wall 50 conforms to the curvature of the ball member 12 for retaining the ball member 12 within the socket 36.

As shown in FIGS. 1–8, 11, and 12, a ramp 58 is secured to the bottom of the housing 24 and projects downwardly therefrom and generally has the same width as the housing 24. The ramp 58 is secured subjacent to the housing 24 and is generally aligned with and encloses the jaw 42 within the housing 24. The ramp 58 includes a generally flat guiding surface 60 which is disposed at a slight angle and serves to guide the ball member 12 into the socket 36 if the ball member 12 is not aligned directly beneath the aperture 38. If the user misaligns the assembly 10 so that the ball member 12 abuts the surface 60, the user can simply move the vehicle 11 very slightly forward. This movement will cause the surface 60 to slide upon the ball member 12 so that the ball member 12 can be brought into alignment with the aperture 38 for insertion and seating within the socket 36.

In order to facilitate the pivotal movement of the jaw 42 coincident with both the insertion of the ball member 12 within the aperture 38 and also with the removal of the housing 24 from the ball member 12, the present invention uses a biasing means which is shown in FIGS. 2–8, 11, and 12. The biasing means is preferably a leaf spring 62 which is secured to the crosspin 44. The spring 62 is secured to the crosspin 44 and has an upper leaf extension 64 in contact with the undersurface of the roof 46 while a lower leaf extension 66 extends downwardly with a slight curvature and abuts at a distal end the surface 60. The spring 62 is biased so that the extensions 64 and 66 abut and apply force against, respectively, the roof 46 and the surface 60. The spring 62 normally biases the jaw 42 to the open or ball releasing position.

Shown in FIGS. 1–6, 8, 9, 11, and 12 is a shroud or cover 68 which is mounted to the roof 32 adjacent the end 28. The cover 68 is mounted to the housing 24 and completely encloses the slot 40. The cover 68 includes a latch member slot 70 which extends longitudinally through approximately two-thirds of the cover 68 from the front to the rear thereof. In addition, the cover 68 includes a back wall 72 which has a finger slot 74 formed thereon. Disposed within the cover 68, and both partially protruding up through the slot 70 and partially extending downwardly within the housing 24 itself, is a secondary locking or latching means in the form of a latch 76. The latch 76 has a unique design which allows it to cooperate with previously described structural components and components to be hereinafter described to easily and quickly lock and unlock the ball member 12 within the socket 36.

The latch 76 includes an actuating portion 78, as shown in FIGS. 1–6, 8, 9, 11, and 12, which protrudes out of the slot 70 for selective manipulation by the user. The actuating portion 78 is never disposed wholly within the cover 68. Projecting down through the slot 40 and into the housing 24 itself is a latch portion 80. The latch portion 80 projects down into the housing 24 adjacent and generally behind the jaw 42. The latch 76 may be a one-piece stamped component, and the actuating portion 78 and the latch portion 80 are the two structural portions integrally formed as a unit for comprising the latch 76.

Figure 5:
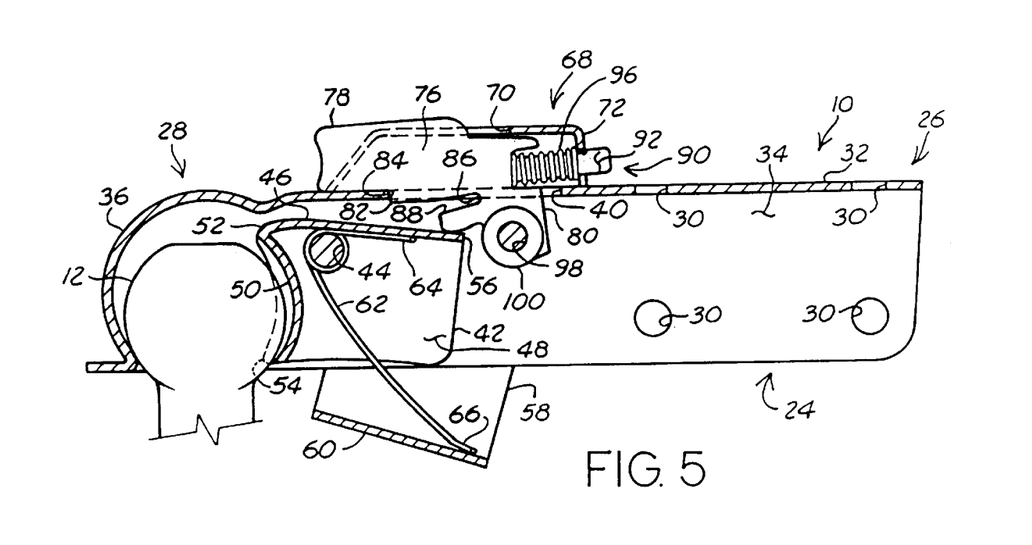
FIG. 5 is a side elevational view of the trailer hitch assembly showing the jaw disposed to the ball releasing position.
Figure 6:
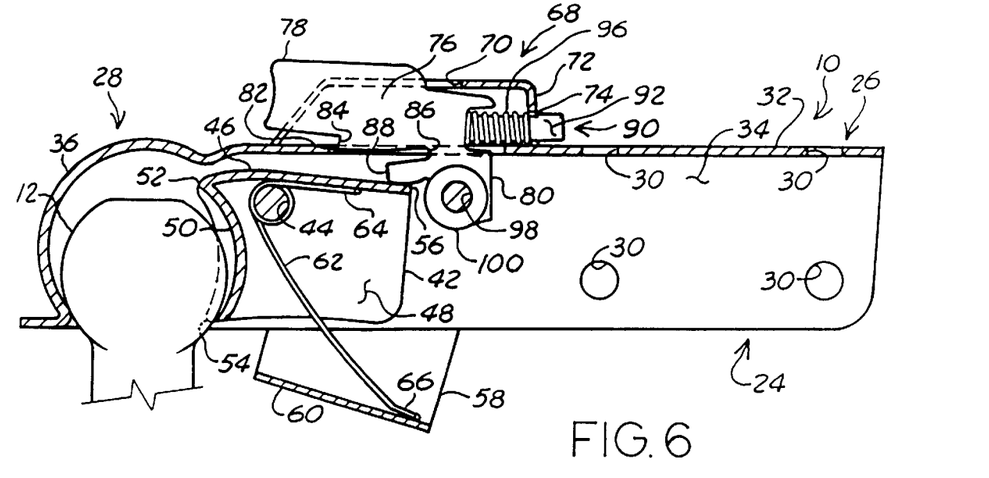
FIG. 6 is a side elevational view of the trailer hitch assembly showing the jaw and the latch disposed to the ball releasing position.
Figure 7:
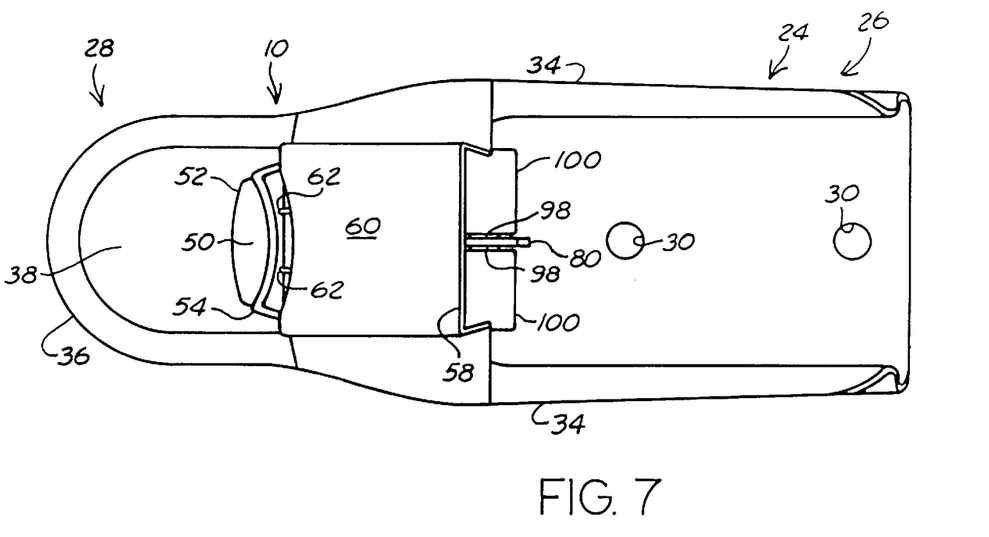
FIG. 7 is a bottom plan view of the trailer hitch assembly first shown in FIG. 1.
Figure 8:
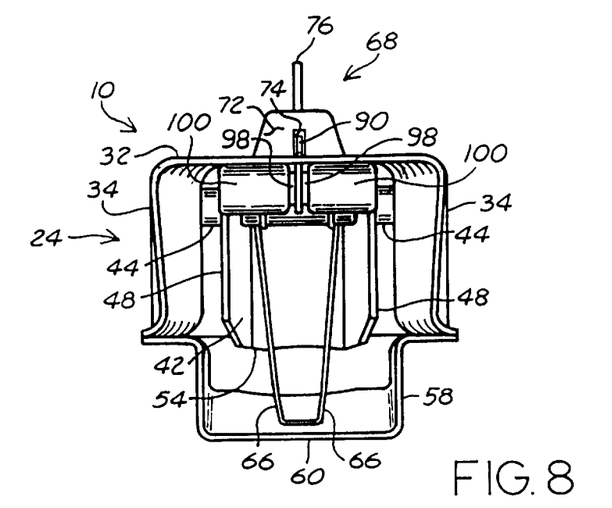
FIG. 8 is a rear elevational view in vertical section of the trailer hitch assembly first shown in FIG. 1.
Figure 9:
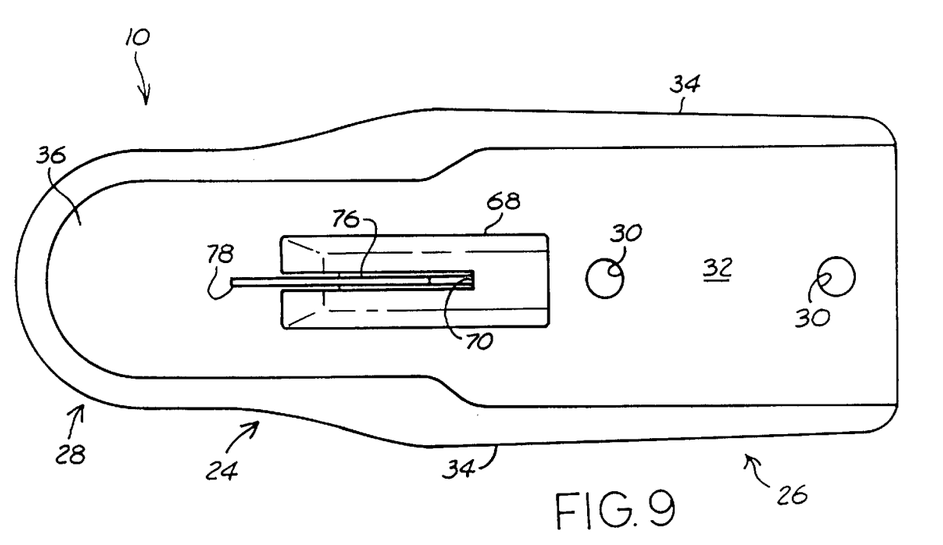
FIG. 9 is a top plan view of the trailer hitch assembly first shown in FIG. 1.
Figure 10:
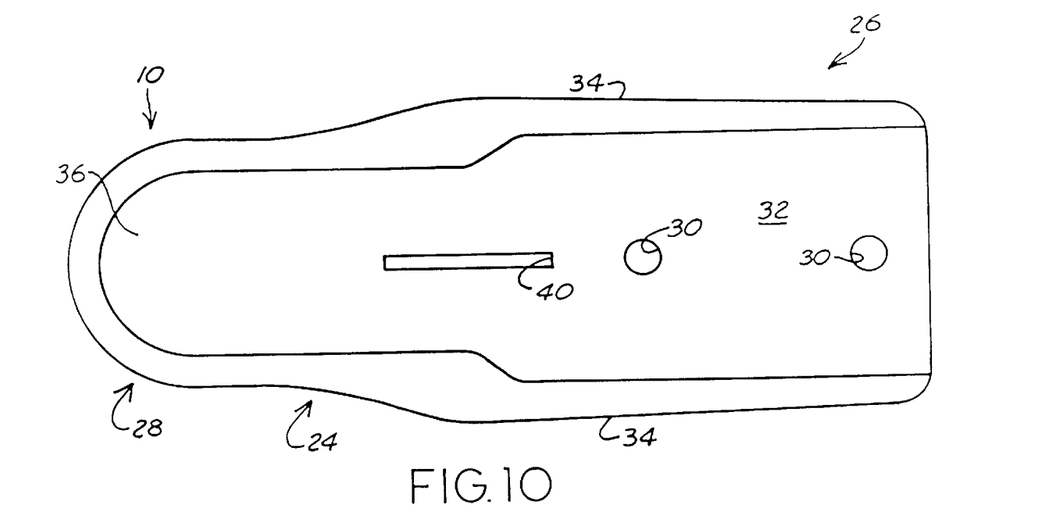
FIG. 10 is a top plan view of the trailer hitch assembly first show in FIG. 9, with the latch and cover removed.

The latch 76 is linearly reciprocably slidable within the cover 68 along and within the slot 40 between a disengaged position concomitant with the ball member 12 being seated and retained within the aperture 38 and an engaged position so that the ball member 12 can be unlocked from the jaw 42 for lifting the assembly 10 up off the ball member 12. The engaged position of the latch 76 is illustrated in FIGS. 5 and 6, and the disengaged position of the latch 76 is shown in FIGS. 2–4, 11, and 12. Manipulation by the user is only required when the latch 76 is to be moved to the engaged position whereupon the jaw 42 can be pivoted to the ball releasing position. The latch 76 does not need to be manipulated to bring the jaw 42 to the ball locking position for locking the ball member 12 within the socket portion 36; hence, the self-locking ability of the assembly 10 results from the unique design, in part, of the latch 76 which cooperates with the jaw 42 to lock the ball member without user intervention.

As shown in FIGS. 5 and 6, when the latch 76 is in the engaged state, the latch 76 is disposed toward the rear of the cover 68. When the latch 76 is disposed in the disengaged state, as illustrated in FIGS. 2–4, 11, and 12, the actuating portion 78 of the latch 76 extends forwardly of the cover 68 through the slot 70 adjacent and slightly above and behind the rounded top of the socket 36. The latch 76 includes a tooth 82 of a right-angled configuration which is shaped to catch the roof 32 at the front 84 of the slot 40. The tooth 82 will abut the roof 32 at the front 84 until the tooth 82 is forced upwardly out of the slot 40 as a result of the insertion and seating of the ball member 12 within the aperture 38.

The tooth 82 can be lifted out of the slot 40 by the intervention of the user. When the tooth 82 is forcibly pushed up out of the slot 40 and comes to rest upon the roof 32 immediately forward of the slot 40, as shown in FIGS. 2–4, 11, and 12, the assembly 10 will be in the ball locking position for allowing insertion and locking of the ball member 12 within the socket 36.

A tongue slot or recess 86 is formed or cut into the latch 76 adjacent the area between the actuating portion 78 and the latch portion 80. The recess 86 moves within the slot 40 concomitant with the slidable reciprocable movement of the latch 76, and the recess 86 provides a clearance space for allowing the latch 76 to move forward in the slot 40 so that the latch 76 does not immediately abut that part of the roof 32 that defines the front 84 of the slot 40.

As shown in FIGS. 2–6, 11, and 12, a rigid tongue 88 projects toward the socket 36 and is integrally formed from the latch portion 80. The forward projection of the tongue 88 forms a space between the tooth 82 and the tongue 88 which is denoted as a recess 86. The tongue 88 serves as an abutment for the pivotal movement of the jaw 42 as the jaw 42 goes from the ball releasing position to the ball locking position and then, as needed, to the ball releasing position. When the jaw 42 is in the ball releasing position, the roof 46 adjacent the rear edge 56 contacts and abuts the tongue 88 and is prevented from further pivotable movement toward the roof 32.

As illustrated in FIGS. 1–8, 11, and 12, an integral elongated finger 90 projects rearwardly, as part of the latch 76, and through the slot 74. The finger 90 terminates with an enlarged, generally square-shaped portion which serves as a flag or safety indicator 92. The indicator 92 may be painted a distinctive color for indicating safety conditions. The indicator 92 is the outer end of a stem 94 integral to the rear portion of the latch 76.

In order to automatically force the latch 76 forward to the disengaged position during the process of receiving and locking the ball member 12 within the aperture 38, a means to impel the latch 76 toward the end 28 is used in combination with the latch 76 and finger 90. More specifically, the means to impel the latch 76 forward includes a compression spring 96 mounted upon and circumjacent to the stem 94. The spring 96 is in the loaded state when a first end is compressed against the inner flat portion of the back wall 72 of the cover 68 while a second opposed end is compressed against the base of the stem 94 where the stem 94 attaches to the rear of the latch 76 above the latch portion 80. The spring 96 rides upon the stem 94 and is disposed to an unloaded or relaxed state when the assembly 10 is in the ball locking position as shown in FIGS. 2–4, 11, and 12. Indeed, the spring 96 is a critical component without which the jaw 42 would not remain locked onto the ball member 12 even if the jaw 42 were to pivot to the ball locking position.

In order to facilitate the pivotal movement of the jaw 42 from the ball locking to the ball releasing position, a slide means is used as shown in FIGS. 2–8, 11, and 12. The slide means facilitates the pivotal movement of the jaw 42 by providing a rotatable surface against which the rear edge 56 can move thereagainst as the jaw 42 selectively pivots from the ball releasing to the ball locking position and then, when necessary, to the ball releasing position. More specifically, the slide means includes a transversely-extending pin 98 which is mounted to and projects through the latch portion 80 and extends between the sidewalls 34. A pair of rollers 100 are journaled onto the portion of the pin 98 that extends on both sides of the base of the latch portion 80, and, depending upon the position of the jaw 42, the rear edge 56 may or may not abut and rotate against the rollers 100. Because the rear edge 56 abuts the rollers 100 when the assembly 10 is in the ball releasing position, the jaw 42 is in a position to pivot against the rollers 100 during the operation of retaining and locking the ball member 12 within the socket 36. In this operation, the rollers 100 physically rotate upon the rear edge 56 and the rearmost portion of the roof 46 as the jaw 42 pivots to the ball locking position.

Figure 1:
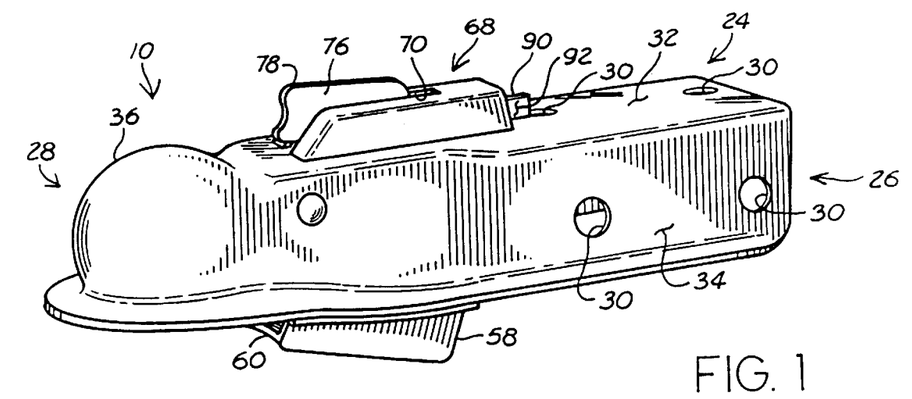
FIG. 1 is a perspective view of the self-locking trailer hitch assembly of the present invention.
Figure 2:
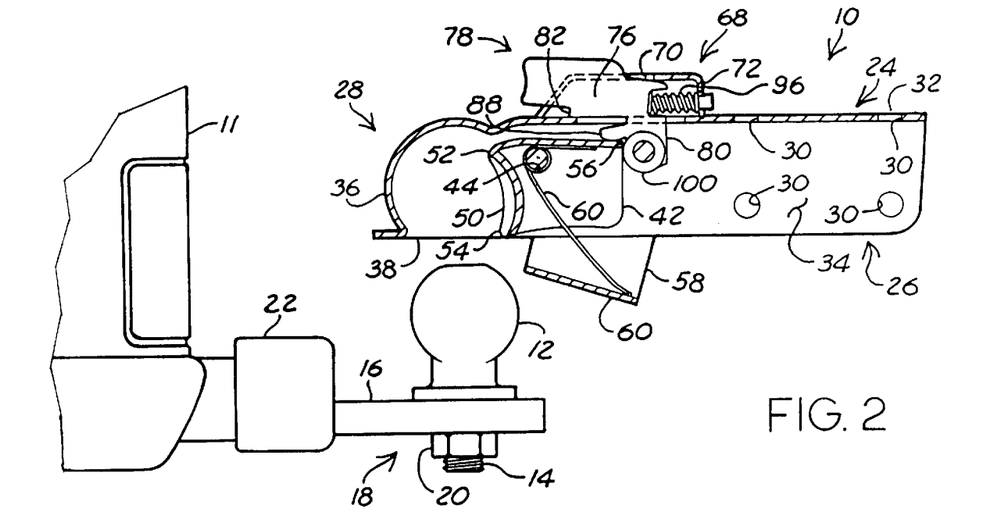
FIG. 2 is a side elevational view of the trailer hitch assembly maneuvered into position above the ball member secured to the towing vehicle.
Figure 11:
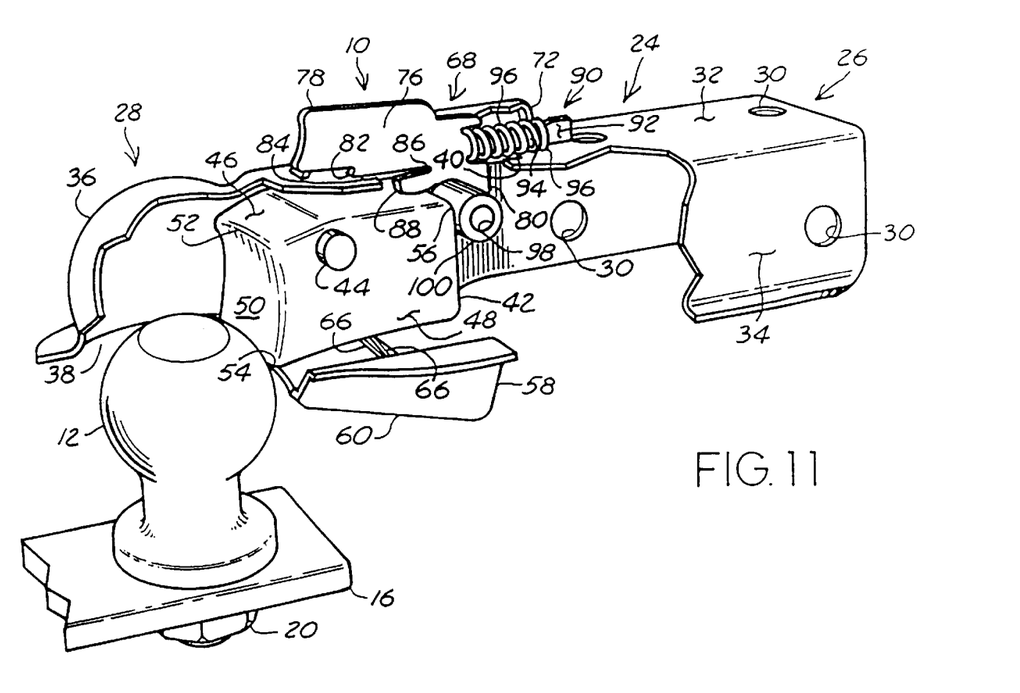
FIG. 11 is an isometric view of the trailer hitch assembly first shown in FIG. 1, with certain areas of the assembly broken away to illustrate the disposition of structural components when in the ball releasing position.

With reference to FIGS. 2–6, 11, and 12, the actual operation of the assembly 10 locking onto and releasing the ball member 12 will now be described. FIGS. 2 and 11 represent the disposition of the assembly 10 and the ball member 12 prior to the seating of the ball member 12 within the socket 36. In FIG. 2 the towed vehicle has been backed up so that the ball member 12 is generally vertically aligned with the aperture 38. The assembly 10 has already been secured to the draft tongue (not shown) of the towed vehicle and this step has been omitted. The jaw 42 is in the ball releasing position whereby the rear edge 56 abuts both the underside of the tongue 88 and also a portion of the curved surface of the rollers 100. The latch 76 is disposed to the rear of the cover 68 and the spring 96 is in the biased or compressed state. The flag 92 extends through the slot 74 and the tooth 82 rests upon the flat surface of the roof 32 above and slightly forward of the slot 40. The extension 64 of the spring 62 forces the rear edge 56 against the underside of the tongue 88, but the tongue 88 serves as an abutment or stop member preventing the rear edge 56 from further upward movement. The ball member 12 is stationarily mounted to the rear of the vehicle 11 and both the vehicle 11 and the assembly 10 can be maneuvered, individually or simultaneously, for properly positioning the assembly 10 over the ball member 12.

Figure 2A:
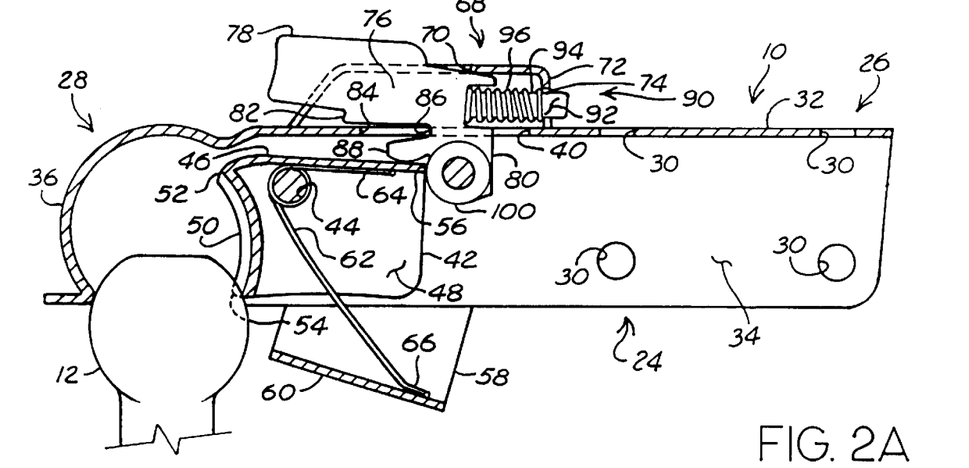
FIG. 2A is a side elevational view of the trailer hitch assembly initially receiving the ball member within the socket of the assembly.

As the assembly 10 is lowered onto the ball member 12, shown in FIG. 2A, with the ball member 12 in vertical alignment with the aperture 38, the first structural component which the ball member 12 contacts is the lip 54.

Figure 3:
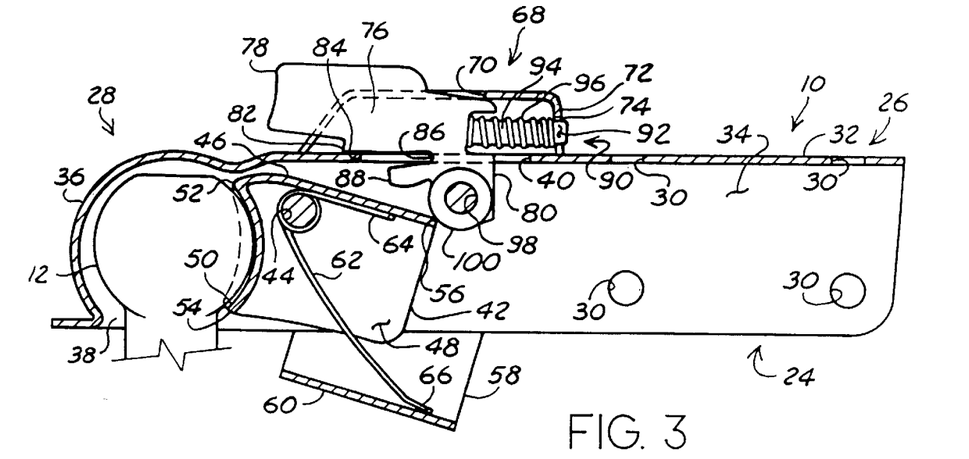
FIG. 3 is a side elevational view of the trailer hitch assembly showing the ball member being received within the socket for locking therein.

As the lip 54 contacts the upper rounded portion of the ball member 12, as illustrated in FIG. 2A, the force of the contact causes the jaw 42 to begin pivoting clockwise upon the crosspin 44 so that the entire ball member 12 can be received within the aperture 38. Coincident with the clockwise pivoting of the jaw 42 as shown in FIG. 2A (and also in FIGS. 3 and 4), the rear edge 56 contacts and slides against the rollers 100, causing the rollers 100 to rotate, thereby facilitating the further pivotable movement of the jaw 42 as the rear edge 56 pivots downward toward the ramp 58. The width of the aperture 38 at the point where the ball member 12 is first received within the socket 36 is just wide enough to allow the ball member 12 to pass therethrough while at the same time the ball member 12 exerts a momentary upward force against the lip 54. As the ball member 12 is received within the aperture 38 for seating therein, the upper portion of the ball member 12 then engages and forceably contacts the lip 52, as shown in FIG. 3. This further contributes to the clockwise pivotable movement of the jaw 42 and also causes the rear edge 56 to continue moving against the rollers 100 downward toward the ramp 58.

Figure 4:
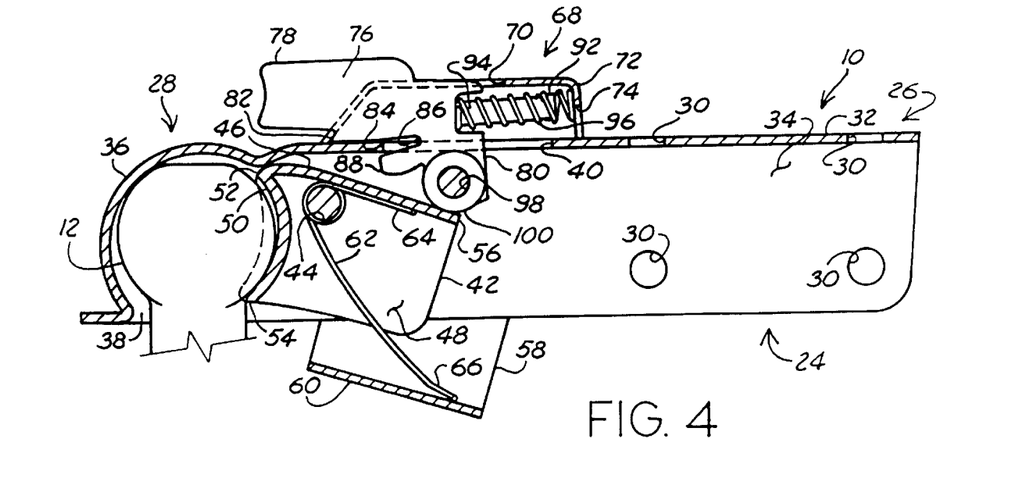
FIG. 4 is a side elevational view of the trailer hitch assembly showing the ball member fully seated and locked within the socket.
Figure 12:
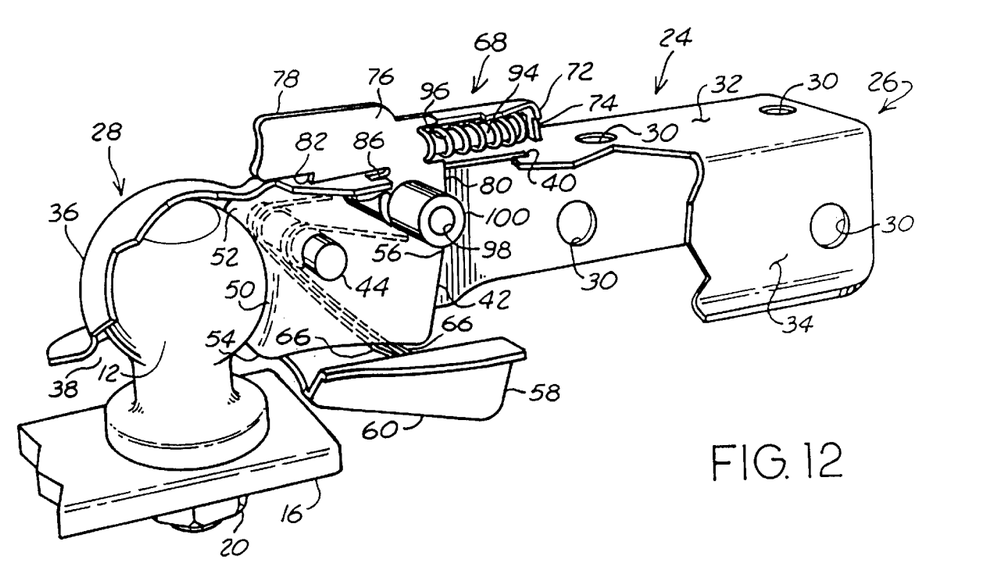
FIG. 12 is an isometric view of the trailer hitch assembly first shown in FIG. 11, with certain areas of the assembly broken away to illustrate the disposition of structural components when in the ball locking position.

FIGS. 4 and 12 show the ball member 12 completely seated and locked within the socket 36. The lip 54 has now pivoted slightly upward so that it contacts the portion of the ball member 12 where the ball member 12 attaches to the stud 14. The lip 52 has been pivoted so that it comes in contact with the inside surface of the roof 32 at that point where the housing 24 and the socket 36 merge or join. Furthermore, the rear edge 56 has been pivoted so that it now contacts the lower cylindrical surface of the rollers 100. The extension 64 forcibly holds the rear edge 56 against the undersurface of the rollers 100, and the rollers 100 themselves serve as a stop for preventing the jaw 42, without user intervention, from pivoting to the ball releasing position It is the abutment of the rear edge 56 against the rollers 100, as shown in FIG. 2, which holds the latch 76 toward the rear of the cover 68 in the engaged state and biases or compresses the spring 96. As the rear edge 56 pivots through the positions shown in FIGS. 2A and 3 to the position shown in FIG. 4, the spring 96 is relaxed and expands within the cover 68 thereby forcing the latch 76 forward toward the socket portion 36 with the tooth 82 riding a slight distance upon the roof 32. The jaw 42 pivots for a very short distance upon the rollers 100 so that the rear edge 56 and the rearmost portion of the roof 46 end up in the position shown in FIG. 4. All of these movements occur almost simultaneously. Because user manipulation of the latch 76 to lock the ball member 12 within the socket 36, as shown in FIGS. 2, 3, and 4, is not required, the assembly 10 is essentially a self-locking structure.

Once the ball member 12 is fully seated within the aperture 38 as shown in FIGS. 4 and 12, the ball member 12 is thereby locked within the socket 36 and cannot be removed by the user lifting the assembly 10 upward away from the ball member 12. If the user were to attempt to lift the assembly 10 off the ball member 12 with the assembly 10 in the disposition shown in FIGS. 4 and 12, which is the ball locking position of the assembly 10, the ball member 12 would simply not pass through the narrowed diameter of the aperture 38 adjacent the stem of the ball member 12. This is due to the fact that the lip 54 would not be able to pivot away from the ball member 12 to enlarge the opening of the aperture 38 which would allow the ball member 12 to pass therethrough. The location of the rollers 100 within the housing 24 and their contact with the rearmost portion of the roof 46 adjacent the rear edge 56 prevents the rear edge 56 from pivoting upward and counterclockwise after the jaw 42 is disposed to the ball locking position shown in FIGS. 4 and 12. Once the jaw 42 is pivoted to the ball locking position of FIGS. 4 and 12, the rollers 100 serve as an abutment member and interpose themselves by the extension of the spring 96 between the rear edge 56 and the roof 32.

As shown in FIG. 5, the latch 76 must be manually manipulated by the user to return the jaw 42 to the ball releasing position for allowing the assembly 10 to be lifted off the ball member 12. In order to move the assembly 10 to the ball releasing position, the user grasps the actuating portion 78 and pushes rearwardly on the latch 76 so that the latch 76 moves toward end 26. Simultaneous with the movement of the latch 76 toward the end 26, the tooth 82 slides rearward upon the roof 32 until it is located immediately above the slot 40 and then the user can push down on the latch 76 so that the tooth 82 catches the front 84 of the slot 40 for disposing the assembly 10 to the ball releasing position of FIG. 5. The rearward slidable movement of the latch 76 within the cover 68 causes the flag 92 to substantially pass through the slot 74 for projecting outwardly through the slot 74. The spring 96 is now compressed or loaded within the cover 68 and the latch 76 is disposed to the engaged state. Concomitant with the slidable rearward movement of the latch 76, the rollers 100 will rotate upon the rearmost portion of the roof 46 allowing the rear edge 56 to pivot upward against the rollers 100 in a counterclockwise direction whereupon the rear edge 56 will abut and come to a stop against the underside of the tongue 88. When the upward pivotable movement of the rear edge 56 is stopped by abutment against the tongue 88 as shown in FIGS. 2, 5, and 11, the jaw 42 will be returned to the ball releasing position and the assembly 10 can be lifted up off the ball member 12.

As the assembly 10 is lifted off the ball member 12, the ball member 12 contacts the lip 54 and presses downwardly thereagainst. This contact causes a slight upward counterclockwise movement of the jaw 42 and actually causes the rear edge 56 to force the tongue 88 upward towards the slot 40. In turn, the latch 76 is forced slightly upward within the cover 68 so that the tooth 82 rises out of the slot 40. As soon as the tooth 82 is no longer held against that portion of the roof 32 which defines the front 84 of the slot 40, the spring 96 immediately expands, forcing the latch 76 toward the socket 36. This forward motion is abruptly checked by the rollers 100 coming into contact with the rear edge 56, and this position is shown in FIGS. 2 and 11. When the rear edge 56 is disposed against the rollers 100 and the rearmost portion of the roof 46 and rear edge 56 is abutting the tongue 88, the assembly 10 will still be in the ball releasing position, with the jaw 42 no longer locked onto the ball member 12, and with the tooth 82 disengaged from the front 84 of the slot 40. To return the assembly 10 to the fully unlocked position, the user can then push back on the actuating portion 78 and then push downward on the latch 76 so that the tooth 82 catches the portion of the roof 32 that defines the front 84 of the slot 40, while the flag 92 catches against the portion of the back wall 72 defining the top of the slot 74. The spring 96 is now compressed between the rear of the latch 76 and the wall 72. The flag 92 is fully projecting outwardly past the slot 74 and, when the flag 92 is viewable, the assembly 10 is in the ball releasing or unlocked position. Alternatively, when the flag 92 is not viewable but is contained within the cover 68, the assembly 10 is in the ball locking position and the jaw 42 is locked onto the ball member 12. Thus, the present invention provides a reliable, simple, and efficient means for self-locking of the assembly 10 onto the ball member 12 which does not require user manipulation of any latches or levers to achieve the locking function. Once the jaw 42 is locked onto the ball member 12 and the assembly 10 is in the ball locking position, the user can only remove the assembly 10 from the ball member 12 by manipulating the latch 76 to initiate the movement of the internal structural components of the assembly 10 to the ball releasing position.

Although a preferred embodiment for the self-locking trailer hitch assembly has been shown and described in detail, it should be understood that various changes and modifications may be made therein without departing from the scope of the appended claims.

We claim:

1. A trailer hitch assembly for removable securement of a towed vehicle to a ball member mounted to the rear of a towing vehicle, the trailer hitch assembly comprising:

an elongated housing having a rear attachment end and an opposite front socket end;

a socket formed at the front socket end having a downwardly-opening socket aperture for receiving the ball member so that the towed vehicle can be joined to the towing vehicle;

a jaw disposed within the housing adjacent the socket aperture for selective pivotable movement on a horizontal axis from a ball locking position for receiving and locking the ball member within the socket to a ball releasing position for releasing the ball member from the socket;

biasing means for biasing the jaw to the ball releasing position when the ball member is not disposed within the socket;

a reciprocable, linearly-slidable latch mounted on the housing and which slides to a disengaged position when the ball member enters the socket and contacts and pivots the jaw, and is slidable to an engaged position for allowing the jaw to pivot and release the ball member from the socket;

slide means rotatably secured to the latch adjacent the jaw and upon which the jaw moves as the ball member pivots the jaw and seats within the socket; and means to impel the latch toward the socket for locking the ball member therein as a function of the ball member contacting and pivoting the jaw to the ball locking position.

2. The trailer hitch assembly of claim 1 wherein the jaw includes a rear edge which contacts and pivots against the slide means during the pivotable movement of the jaw from the ball locking position to the ball releasing position.

3. The trailer hitch assembly of claim 2 wherein the jaw includes an inner projecting lip opposite the rear edge which is engaged by the ball member and forced upwardly toward the latch as a result of the ball member entering the socket aperture and being locked within the socket.

4. The trailer hitch assembly of claim 3 wherein the jaw includes a lower projecting lip which pivots toward the ball member as a result of the ball member contacting the projecting lip so that the ball member can be seated within the socket aperture and and locked by the ball member within the socket aperture.

5. The trailer hitch assembly of claim 4 wherein the jaw includes an upper surface, a pair of opposed sidewalls depending from the upper wall and a front concave-shaped wall which encloses the ball member within the socket aperture when the jaw is disposed in the ball looking position.

6. The trailer hitch assembly of claim 1 further comprising a ramp mounted to the housing subjacent the jaw for guiding the ball member toward the socket aperture and facilitating positioning of the ball member beneath the socket aperture.

7. The trailer hitch assembly of claim 1 wherein the biasing means includes a crosspin extending transversely within the housing and which is mounted to the sidewalls of the housing.

8. The trailer hitch assembly of claim 7 wherein the biasing means includes a leaf spring mounted on the crosspin for contacting and forcing the jaw to pivot to the ball releasing position.

9. The trailer hitch assembly of claim 1 wherein the latch includes a latch portion which projects down ito the housing rearwardly of the jaw.

10. The trailer hitch assembly of claim 9 wherein the slide means includes a pin mounted to the latch portion and which extends transversely between the sidewalls of the housing.

11. The trailer hitch assembly of claim 10 wherein the slide means includes a pair of rollers rotatably mounted to the pin for providing a rolling surface for allowing pivotable movement thereagainst by the rear edge of the jaw.

12. The trailer hitch assembly of claim 11 wherein the latch portion includes a tongue projecting toward the socket and which abuts the rear edge of the jaw whereby the jaw is in the ball releasing position, thus delimiting the upward movement of the rear edge.

13. The trailer hitch assembly of claim 1 wherein the means to impel the latch toward the socket includes a finger substantially enclosed within the shroud and mounted to the latch and which projects toward the attachment end.

14. The trailer hitch assembly of claim 13 wherein the means to impel the latch toward the socket includes a compression spring mounted on the finger and enclosed within the shroud for actuation from a loaded state when the jaw is disposed in the ball releasing position to an unloaded state coincident with the ball member pivoting the jaw to the ball locking position, thereby allowing the spring to expand within the shroud impelling the latch toward the socket and maintaining the jaw in the ball locking position.

15. A trailer hitch assembly for securement to a towed vehicle and which is attached to a ball member mounted to the rear of a towing vehicle, the trailer hitch assembly comprising:

a housing having a rear end and an opposite front end in the form of a socket having a downwardly-opening socket aperture for receiving the ball member so that the towed vehicle can be joined to the towing vehicle;

a jaw disposed within the housing adjacent the socket aperture for selective pivotable movement on a horizontal axis so the ball member can be locked within the socket and also selectively released from the socket;

biasing means for biasing the jaw to a ball releasing position when the ball member is not disposed within the socket;

a reciprocable, linearly-slidable latch mounted on the housing and which slides to a disengaged position when the ball member is received within the socket and is slidable to an engaged position for releasing the ball member from the socket;

slide means rotatably secured to the latch adjacent the jaw and upon which the jaw moves as the ball member abuts and pivots the jaw for seating within the socket; and means to impel the latch toward the socket for locking the ball member therein coincident with the ball member contacting and pivoting the jaw to the ball locking position and also movable toward the attachment end for allowing the jaw to pivot to the ball releasing position for unlocking the ball from the socket.

* * * * *